Dec. 23, 1969  W. F. PECK  3,485,609
METHOD OF MAKING FIBER OPTICAL STRUCTURES WITH
HYDROSTATIC PRESSURE
Filed March 31, 1965  2 Sheets-Sheet 1
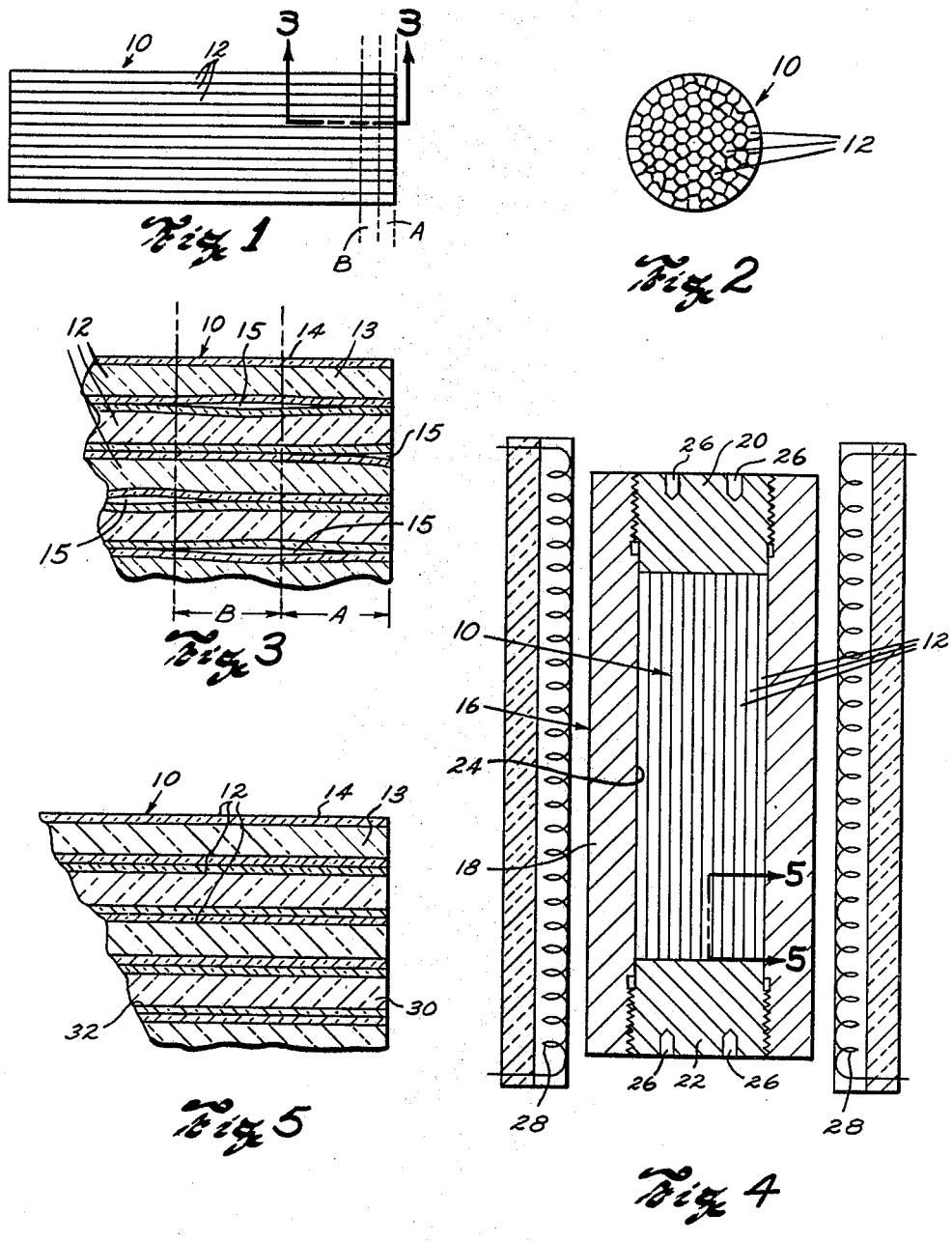
INVENTOR.
WILLIAM F. PECK
BY
ATTORNEY Dec. 23, 1969   W. F. PECK   3,485,609
METHOD OF MAKING FIBER OPTICAL STRUCTURES WITH
HYDROSTATIC PRESSURE
Filed March 31, 1965                                    2 Sheets-Sheet 2

INVENTOR.
WILLIAM F. PECK
BY
J. Albert Kultquist
ATTORNEY

United States Patent Office

3,485,609
Patented Dec. 23, 1969

---

3,485,609
METHOD OF MAKING FIBER OPTICAL STRUCTURES WITH HYDROSTATIC PRESSURE
William F. Peck, Sturbridge, Mass., assignor, by mesne assignments, to American Optical Company, Southbridge, Mass., a corporation of Delaware
Filed Mar. 31, 1965, Ser. No. 444,116
Int. Cl. C03b 37/00
U.S. Cl. 65—4                                  3 Claims

---

ABSTRACT OF THE DISCLOSURE

Sealing porosities in fused bundles of glass clad energy-conducting fibers by constraining the bundles against appreciable dimensional expansion and developing high hydrostatic pressure in the glasses of the fibers.

---

This invention relates to the manufacture of fiber energy-conducting structures and has particular reference to an improved process for rendering fused assemblies of glass optical fibers vacuum tight for use as light-conducting walls, partitions or end faces of evacuated electron discharge tubes or similar devices.

Present day fiber optic face plates comprise literally many thousands of fibers bundled together in side-by-side relationship which, for vacuum tightness, must all be fused to one another substantially without intervening spaces. However, as it is well known in the industry, extreme difficulty is encountered in attempting to avoid the occurence of porosities in such structures which, for the most part, result from air and/or gases becoming trapped between the fibers at the time of their fusion. Such entrapped gases tend to produce elongated and/or interconnected interstices between the fibers which frequently extend from one end to the other of the fiber bundle and, thus create porosities. In relatively long bundles of fused fibers which may as a whole be gas tight but are intended to be sliced transversely into relatively thin plates, interstices often occur internally of the bundle and extend through particular sections thereof from which one or more of the plates are formed so as to render such plates porous and unsuitable for use as face pieces in applications where vacuum tightness is required.

While it has been found that the application of high external fluid or mechanical pressures to the sides of bundles of fibers being fused does tend to close interstices existing therein which the result of reducing the leak rate of fused fiber bundles and sections cut therefrom, there is the attendent problem of costliness in processing equipment and operating time required to perform such operations. In view of this problem, the increased yield of vacuum tight structures does not always economically outweight the scrap yield of processes not requiring expensive high pressure equipment.

An aim of this invention is to reduce the current scrap yield and relatively high manufacturing costs in the processing of fiber optic devices requiring vacuum tightness; and, accordingly, an object of the present invention is to achieve vacuum tightness in fused bundles of glass light-conducting fibers in an unusually simple, reliable and inexpensive manner.

Another object of the invention is to hermetically seal interstices occuring in conventionally fused fiber optic bundles intended for use as end walls or face pieces in evacuated electron discharge devices or in other applications where gas tightness is required.

To attain the aforesaid objects and others which may appear from the following detailed description in accordance with the principles of my invention, the thermal expansion properties of fiber optic glasses relative to those of an outer processing jacket are used to generate pressure in the glass at high temperatures. A prefused bundle of glass fibers which may have interstices therein is constrained both laterally and endwise in a casing of high strength refractory material having a substantially lower coefficient of expansion than the fiber glasses. Tungsten or molybdenum have been determined to be suitable materials for the fabrication of the casing. The relative internal dimensions of the casing and external dimensions of the fiber bundle are controlled to provide only sufficient clearance therebetween to permit insertion and removal of the bundle when both the bundle and casing are at or near normal room temperature.

With the fiber bundle constrained in the casing, the combination is heated to a softening temperature of the fiber glasses but below the softening temperature of the casing material. This produces a differential expansion of the casing and glass materials with the glass expanding most rapidly. Mechanical interference between the bundle and casing occurs quickly or at an early stage of the heating and thereafter, elastic strain builds up in the constrained glass producing a compressive stress therein which becomes a high fluid or hydrostatic pressure when the softening temperature of the glass is reached.

It has been found that by heating the constrained glass to its fusing temperature or slightly thereabove, the hydrostatic pressure created in the softened glass becomes sufficient to overcome gas pressure and surface tension forces in at least the major portion of interstices existing between the fibers. This causes a closing of the interstices or at least a major reduction in their size and a fusing together of surrounding areas of glass. Interstices tending to resist complete closure are generally caused to break up into minute unconnected bubbles of a substantially smaller dimension than the thickness of any one section of the bundle intended to be used as a vacuum tight face piece. Thus, the bundle as a whole or sections thereof of appreciable thickness are rendered vacuum tight.

The present invention will be more fully understood by reference to the following detailed description which is accompanied by a drawing in which:

FIG. 1 illustrates, in side elevation, a fused bundle of glass optical fibers which exemplifies a type of structure intended to be processed according to principles of this invention;

FIG. 2 is an end view of the bundle;

FIG. 3 is a greatly enlarged fragmentary cross-sectional view taken on line 3—3 of FIG. 1;

FIG. 4 is a cross-sectional illustration of one form of apparatus used in carrying out the method of this invention;

FIG. 5 is a greatly enlarged fragmentary cross-section taken on line 5—5 in FIG. 4 of a fused bundle of fibers following treatment thereof according to the method of this invention;

Figure 6:
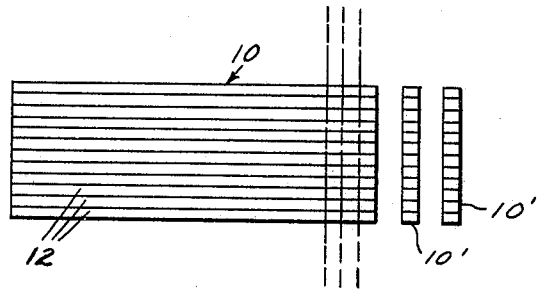
FIG. 6 shows the forming of face plates from the bundle.

Referring now to FIGS. 1, 2 and 3 in particular, there is shown bundle 10 comprised of a multiplicity of long and thin glass-clad glass fibers 12 fused together in side-by-side relationship. Fibers 12 each comprise core 13 of glass of relatively high refractive index surrounded by cladding 14 of glass having a relatively low index of refraction for use as individual light guides for conducting light from one end to the other thereof by total internal reflection as is now well understood in the art of fiber optics. FIGS. 1, 2 and 3 in the drawing are intended to depict a structure which is generally typical of those produced by prior art techniques of bundling and fusing where interstices 15 (FIG. 3) resulting from entrapped air and gases between the fibers frequently occur. While, in FIG. 3, interstices 15 have been somewhat exaggerated in size for purposes of clearer illustration, they, nevertheless, may occur in such magnitude and numbers as to render the entire bundle or at least portions of the length thereof, such as sections A or B of FIG. 3, porous.

The present invention is directed primarily to a technique for treating relatively long bundles of fibers so as to close and seal substantially all interstices therein and render substantially all sections of such bundles vacuum tight whereby a number of plate-like sections such as A and B or others cut transversely therefrom will be suitable for use as vacuum tight face plates or the like.

According to principles of this invention, the thermal expansion properties of the glasses themselves of fibers 12 in bundle 10 are used to generate a high pressure therein at high temperatures so as to force opposing surface areas of the glass which surrounds interstices 15 into closed relationship with each other and fuse together. This is accomplished, according to one aspect of the invention, by placing bundle 10 in casing 16 (FIG. 4) formed of a material having a substantially lower expansion coefficient and considerably higher softening temperature than the glasses of fibers 12. Casing 16 is comprised of tubular main body section 18 having end closures 20 and 22, at least one of which is removable so as to permit insertion and removal of bundle 10 into and from cavity 24. In the drawing, end closures 20 and 22 are both illustrated as being removably threaded into body section 18. Apertures 26 are provided in each of the end closures 20 and 22 for receiving a spanner wrench, not shown, by means of which a threading of the closure into or out of body section 18 can be facilitated.

Just enough clearance is provided between bundle 10 and inner walls of cavity 24 as to permit easy insertion and removal of bundle 10 when both the bundle and casing 16 are at or near normal room temperature. One way of accomplishing this is by preforming or grinding the sides of bundles 10 to the size and shape required to produce the above-mentioned fit prior to its placement within casing 16. A clearance of approximately .001 inch between bundle 10 and casing 16 has been found to be adequate. After bundle 10 is inserted into casing 16, end closures 20 and 22 are threaded into body section 18 until contact is made with the corresponding opposite ends of bundle 10.

When the combination of casing 16 and bundle 10 are subsequently heated, a volume expansion of the glasses of fibers 12 will take place during early stages of the heating until the bundle fills out cavity 24 and comes into contact with inner walls of body section 18. With end closures 20 and 22 in contact with the ends of bundle 10 only a lateral expansion of bundle 10 is permitted to take place which, accordingly, alters the shape of bundle 10 slightly with a tendency to distort the fibers therein. In view of this, it is preferable to back one or both of the end closures 20 and 22 away from the ends of bundle 10 an amount sufficient to provide a clearance therebetween which is sufficient to permit bundle 10 to expand proportionally in all directions and to make both end contact with closures 20, 22 and side contact with body section 18 simultaneously when its volume expansion is such as to fill out cavity 24.

Once having inserted bundle 10 into casing 16 and closed both ends as described above, the combination is heated as a unit gradually to a softening temperature of the glasses of fibers 12. By softening temperature it is meant not only a temperature a which softening of the glasses is apparent to the eye but also includes any temperature at which the glasses tend to fuse and to flow under pressure. This is accomplished by placing casing 16 containing bundle 10 in a furance or between heating elements 28 such as are diagrammatically illustrated in FIG. 4. The manner in which heat is applied to casing 16 is immaterial to this invention and, accordingly, either gas heated or electrically heated furnaces may be used in lieu of elements 28.

As the glasses of fibers 12 and the material of casing 16 are heated, both expand but the glasses expand by greater amounts per degree rise in temperature than the casing until mechanical interference occurs between bundle 10 and casing 16. Thereafter, elastic strain builds up in the glasses and materials of casing 16 producing a compressive stress in the glasses which becomes a high fluid or hydrostatic pressure as the glasses approach or reach their softening temperature. This hydrostatic pressure opposes gas pressure and surface tension forces in at least the major portion of interstices 15 existing between fibers 12 and produces a substantially complete closing thereof. Upon closing, the surface areas of glass initially surrounding interstices 15 become hermetically fused together. Gases initially in interstices 15 are, for the most part, caused to dissolve within or become absorbed by the glasses of fibers 10. While some interstices may tend to resist complete closure due to surface tension forces resisting the fluid pressure in bundle 10, it has been found that these interstices which once may have created a leak in bundle 10 are caused to become greatly reduced in size and broken up into unconnected minute bubbles no longer capable of causing a leak.

The cross-section of bundle 10 shown in FIG. 5 illustrates the results of vacuum tightness attainable by practice of this invention where interstices 15 (FIG. 3) have been closed and fused.

A typical fiber optical bundle 10 having interstices 15 therein intended to be sealed according to principles of this invention would comprise a fused assembly of fibers 12 each having a core 13 of lanthanum flint glass and a relatively thin cladding 14 of borosilicate crown glass. With the volume of glasses in bundle 10 being in the order of approximately 75% lanthanum flint having a coefficient of expansion of approximately $77 \times 10^{-7}$ per degree centigrade and 25% borosilicate crown having a coefficient of expansion of approximately $50 \times 10^{-7}$ per degree centigrade, the bundle would have a net coefficient of expansion of approximately $70 \times 10^{-7}$ per degree centigrade.

A typical casing 16 for receiving a bundle 10 of approximately 1½ inches in diameter and 4 inches long which is formed of the above mentioned flint and crown glasses would comprise tubular body section 18 having a wall thickness of approximately ½ inch or greater and end closures 20 and 22 all formed of a high strength low expansion metal such as tungsten or molybdenum which has a coefficient of expansion of approximately $45 \times 10^{-7}$ per degree centigrade.

With the bundle 10 of lanthanum flint and borosilicate crown glasses constrained in casing 16 of tungsten or molybdenum, it is heated to approximately 1360° F. and held at that temperature for a period of time, approximately one hour, sufficient to assure a complete penetration of the heat through the glasses of bundle 10 and a substantially uniform heating thereof to the 1360° F. temperature. This temperature is above the softening temperatures of both the lanthanum flint and borosilicate crown glasses which have softening temperatures of approximately 1270° F. and 1310° F. respectively.

At approximately 1360° F. a hydrostatic pressure of approximately 30,000 pounds per square inch is produced in bundle 10 which has been found to effect closure and sealing of interstices 15 in the manner outlined above.

It should be understood that the foregoing examples of glasses, metals, temperatures and time cycles are given only for purposes of illustration and are not to be interpreted as restrictive of the invention. It should also be appreciated that the particular form of fibers 12 which have been illustrated herein as each embodying a single core and cladding might be fibers of the type which each comprise a plurality of core sections each individually clad and all fused together. Such fibers are known and referred to in the art as "multifibers."

Upon completion of the operation described above the fiber bundle 10 is cooled to approximately normal room temperature and thereafter removed from casing 16. In order to avoid possible fracturing or the introduction of undue strain and stresses in bundle 10 during the cooling thereof, it is preferable to reduce the temperature of the assembly gradually at a rate of approximately one degree per minute from a point slightly above the annealing temperature of the fiber core glass down to the strain point of the fiber-cladding glass. For the above given examples of lanthanum flint core glass and borosilicate crown glass, the annealing temperature and strain point respectively thereof would be 1100° F. and 800° F. Upon lowering the temperature of bundle 10 to below the above mentioned 800° F. strain point, the assembly may be cooled at any desired rate to approximately normal room temperature.

Figure 7:
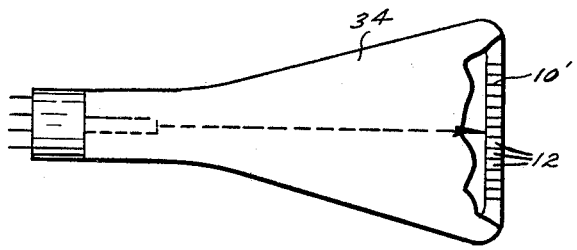
FIG. 7 illustrates one such face plate in use as a part of the outer wall of an evacuated electronic device.

After removal from casing 16, the vacuum tight bundle 10 can be used as a unit or, as illustrated in FIG. 6, it may be cut transversely into a number of plate-like sections 10' each of which will be vacuum tight and adaptable for use as an image-conducting wall or face plate 10" in an evacuated electron discharge device such as cathode ray tube 34 shown in FIG. 7. Usually the minimum thickness of sections 10' is determined by considerations of strength necessary to support the wall against atmospheric pressure.

In instances where a bundle of fibers formed of glasses such as ordinary crown or flint glasses or the like having coefficients of expansion only slightly above that of casing 16 are to be processed according to principle of this invention, high expansion spacer means may be placed between the bundle and casing to produce a substantial expansion differential between the bundle and the high expansion means so as to constrain the bundle against appreciable volume expansion.

Figure 8:
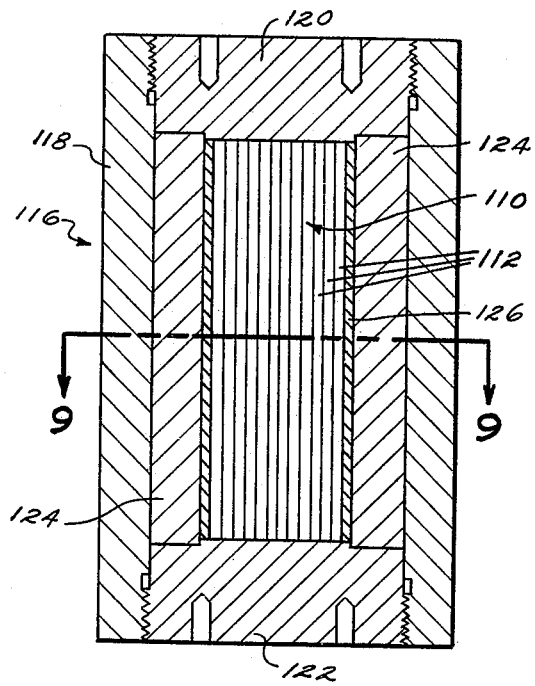
FIG. 8 illustrates, in longitudinal cross-section, a modified form of processing equipment.
Figure 9:
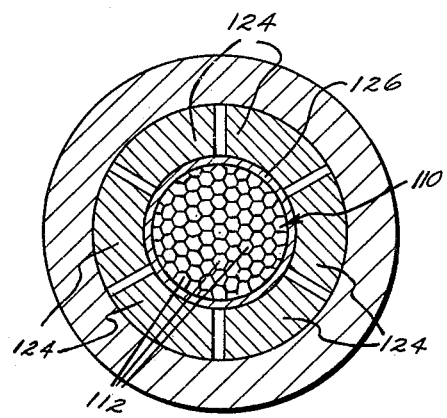
FIG. 9 is a cross-sectional view taken along line 9—9 of FIG. 8.

In FIGS. 8 and 9 there is illustrated casing 116 having tubular body section 118 and end closures 120, 122. Bundle 110 of fibers 112 formed of glasses having a net coefficient of expansion approximately equal to or only slightly greater than the material of body section 118 is placed centrally within casing 116. Body member 118 is formed of a high strength material such as tungsten or molybdenum. Between bundle 110 and body section 118 are spacers 124 formed of a metal having a high coefficient of expansion such as, for example, stainless steel having an expansion coefficient of $160 \times 10^{-7}$ per degree centigrade. Spacers 124 are separated from one another as illustrated in FIG. 9 so as to direct the forces resulting from expansion thereof substantially only radially toward bundle 110. The expansion of spacers 124 in other directions will be taken up by the separations therebetween and thus minimize the forces exerted against and tending to distort body member 118 during the expansion of spacers 124. In view of the separations between spacers 124, bundle 110 is contained in jacket 126 to prevent the glasses thereof from flowing into said separations when the glasses are heated to temperatures near their softening points should the separations not become completely closed by expansion of spacers 124 before the glasses become heat softened. Jacket 126 is preferably formed of steel or another such metal having approximately the same coefficient of expansion as the glasses of fibers 112 but a softening temperature considerably higher than that of the fibers.

End closures 120 and 122 can be formed either of the same material as body section 118 or of the same material as spacers 124. In the first mentioned case, there being only little difference in expansion coefficients between closures 120, 122 and the glasses of bundle 110, endwise expansion of the end closures 120, 122 and the glasses by approximately the same amounts during heating thereof would tend to permit some elongation of the bundle to take place with the result of less hydrostatic pressure developed in the glasses than would be attainable by preventing such elongation of the bundle. In the latter case, end closures formed of the same high expansion material as spacers 124 would prevent elongation of the bundle and produce the more desirable result of developing higher hydrostatic pressure in the bundle.

It should be appreciated that by selecting various different low and high expansion materials for body section 118 and spacers 124 respectively, it is possible to choose less expensive, more readily available and more readily machineable metals than tungsten or molybdenum for the construction of body section 118 and end closures 120, 122 while still providing a sufficient differential in expansion between the casing 16 materials and glasses of bundle 110 to produce the desired result of effecting closure of interstices in the bundle with high hydrostatic pressure therein. Also, spacers 124 can be in the form of a continuous hollow cylinder if desired provided body member 118 is of sufficient thickness and rigidity to resist appreciable distortion under pressures exerted thereagainst during the processing of bundle 110 at high temperatures.

I claim:

1. The method of hermetically sealing undesirable interstices existing in a cylindrically shaped fused bundle of glass energy-conducting fibers arranged in substantially parallel side-by-side relationship with corresponding opposite ends of the fibers forming respective opposite ends of the bundle, said method comprising:

placing the bundle longitudinally within a tubular casing formed of a rigid high strength material having a substantially lower coefficient of expansion and a considerably higher softening temperature than the glasses of said fibers, the inner and outer diameters respectively of the casing and bundle being such as to provide minimum clearance therebetween for permitting insertion and removal of said bundle when said bundle and casing are both at approximately room temperature;

constraining the bundle against appreciable longitudinal expansion in said casing; and heating the combination of said casing and bundle of fibers therein to a temperature above the softening temperature of said glasses but below the softening temperature of the material of said casing, said temperature being sufficient to expand the glasses of said bundle into constraint against said casing and to thereafter cause the development of a high hydrostatic pressure in said glasses causing said interstices to close and surface areas of glass therearound to fuse together.

2. The method of rendering a prefused bundle of glass-clad energy-conducting fibers impervious to air and gases comprising the steps of:

placing said bundle under constraint against appreciable dimensional expansion within a casing of material known to have a substantially lower coefficient of thermal expansion and higher softening temperature than respective like properties of the glasses of said bundle;

heating the combination of said bundle and casing to a temperature within the range between the softening temperatures of said casing material and glasses thereby developing high hydrostatic pressure within said glasses to cause closing and sealing of porosities happening to exist in said bundle;

cooling said casing and bundle to a handling temperature; and removing said bundle from said casing.

3. The method of making gas tight fiber energy-conducting plates from a prefused bundle of glass clad energy-conducting fibers comprising the steps of:

placing said bundle under constraint against appreciable dimensional expansion within a casing of material known to have a substantially lower coefficient of thermal expansion and higher softening temperature than respective like properties of the glasses of said bundle;

heating the combination of said bundle and casing to a temperature within the range between the softening temperatures of said casing material and glasses thereby developing high hydrostatic pressure within said glasses to cause closing and sealing of porosities happening to exist in said bundle;

cooling said casing and bundle to a handling temperature;

removing said bundle from said casing; and cutting said bundle transversely into a number of short lengths to from said plates.

References Cited

UNITED STATES PATENTS

| | | | |
|---|---|---|---|
| 3,211,540 | 12/1965 | Cole | 65—4 |
| 3,269,817 | 8/1966 | Bondley | 65—4 |
| 3,224,851 | 12/1965 | Hick | 65—4 |
| 3,331,670 | 7/1967 | Cole | 65—4 |

FRANK W. MIGA, Primary Examiner

U.S. Cl. X.R.

65—36, 38, 111, 268, 374; 350—96